US012610227B2

(12) United States Patent
Avetoom

(10) Patent No.: US 12,610,227 B2
(45) Date of Patent: Apr. 21, 2026

(54) SIM PROVISIONING VIA WiFi

(71) Applicant: T-Mobile Innovations LLC, Overland Park, KS (US)

(72) Inventor: Paul Avetoom, Bellevue, WA (US)

(73) Assignee: T-Mobile Innovations LLC

( * ) Notice: Subject to any disclaimer, the term of this patent is extended or adjusted under 35 U.S.C. 154(b) by 315 days.

(21) Appl. No.: 18/334,300

(22) Filed: Jun. 13, 2023

(65) Prior Publication Data

US 2024/0214795 A1      Jun. 27, 2024

Related U.S. Application Data

(60) Provisional application No. 63/434,847, filed on Dec. 22, 2022.

(51) Int. Cl.
| | |
|---|---|
| *H04W 8/20* | (2009.01) |
| *H04W 8/18* | (2009.01) |
| *H04W 84/12* | (2009.01) |

(52) U.S. Cl.
CPC ............ *H04W 8/183* (2013.01); *H04W 84/12* (2013.01)

(58) Field of Classification Search
CPC ..... H04W 8/183; H04W 12/45; H04W 88/06; H04W 60/005; H04W 12/08; H04W 60/04; H04W 8/205; H04W 60/00; H04W 8/20; H04W 4/90; H04W 4/14; H04W 8/18; H04W 48/18; H04M 15/715; H04M 1/724; H04M 15/07; H04M 15/70; H04M 15/72; H04M 15/725; H04M 15/7556;

H04M 15/80; H04M 15/8038; H04M 15/8083; H04M 15/93; H04M 2207/18; H04M 2215/2026; H04M 2215/208; H04M 3/42178
See application file for complete search history.

(56) References Cited

U.S. PATENT DOCUMENTS

| | | | |
|---|---|---|---|
| 8,718,710 B2 | 5/2014 | Billman | |
| 9,699,754 B1 * | 7/2017 | Mauer ................... | H04W 28/24 |
| 2013/0303122 A1 * | 11/2013 | Li ........................... | H04W 8/20 |
| | | | 455/418 |
| 2013/0324170 A1 | 12/2013 | Watfa | |

(Continued)

FOREIGN PATENT DOCUMENTS

| | | | | |
|---|---|---|---|---|
| CN | 102520988 A | * | 6/2012 | |
| WO | WO-2018049870 A1 | * | 3/2018 | .............. H04W 8/18 |

OTHER PUBLICATIONS

Avetoom, Paul, "SIM Provisioning Via WiFi," filed Dec. 22, 2022 U.S. Appl. No. 63/434,847.

*Primary Examiner* — Quan M Hua

(57) ABSTRACT

A method for obtaining, at first activation of a SIM device, CPS files from a mobile service provider is provided. The method comprises establishing by an application stored on the SIM device before activation a WiFi connection to a core network of the mobile service provider, sending by the application via the WiFi connection a message to an OTA platform of the mobile service provider, the message comprising an identifier of the SIM device and a request for CPS files associated with the SIM device, receiving by the application a Short Message Service (SMS) message via the WiFi connection, the SMS message comprising the CPS files, and storing by the application the CPS files in the SIM device.

18 Claims, 9 Drawing Sheets

(56)                     References Cited

U.S. PATENT DOCUMENTS

| | | | |
|---|---|---|---|
| 2014/0052984 A1* | 2/2014 | Gupta | H04L 61/4511 |
| | | | 713/162 |
| 2015/0282013 A1* | 10/2015 | Kim | H04W 24/10 |
| | | | 370/331 |
| 2016/0020803 A1* | 1/2016 | Cha | H04W 76/10 |
| | | | 455/558 |
| 2016/0261596 A1* | 9/2016 | Khello | H04W 12/08 |
| 2016/0360456 A1* | 12/2016 | Vashi | H04B 7/2628 |
| 2017/0111752 A1* | 4/2017 | Huang-Fu | H04W 12/06 |

* cited by examiner

200

Begin

202 — Establish a WiFi connection
to a core network of a mobile service provider 204 — Send a CPS request to an OTA platform via the WiFi connection 206 — Receive CPS files in an SMS message via the WiFi connection 208 — Store the CPS files in the SIM device End

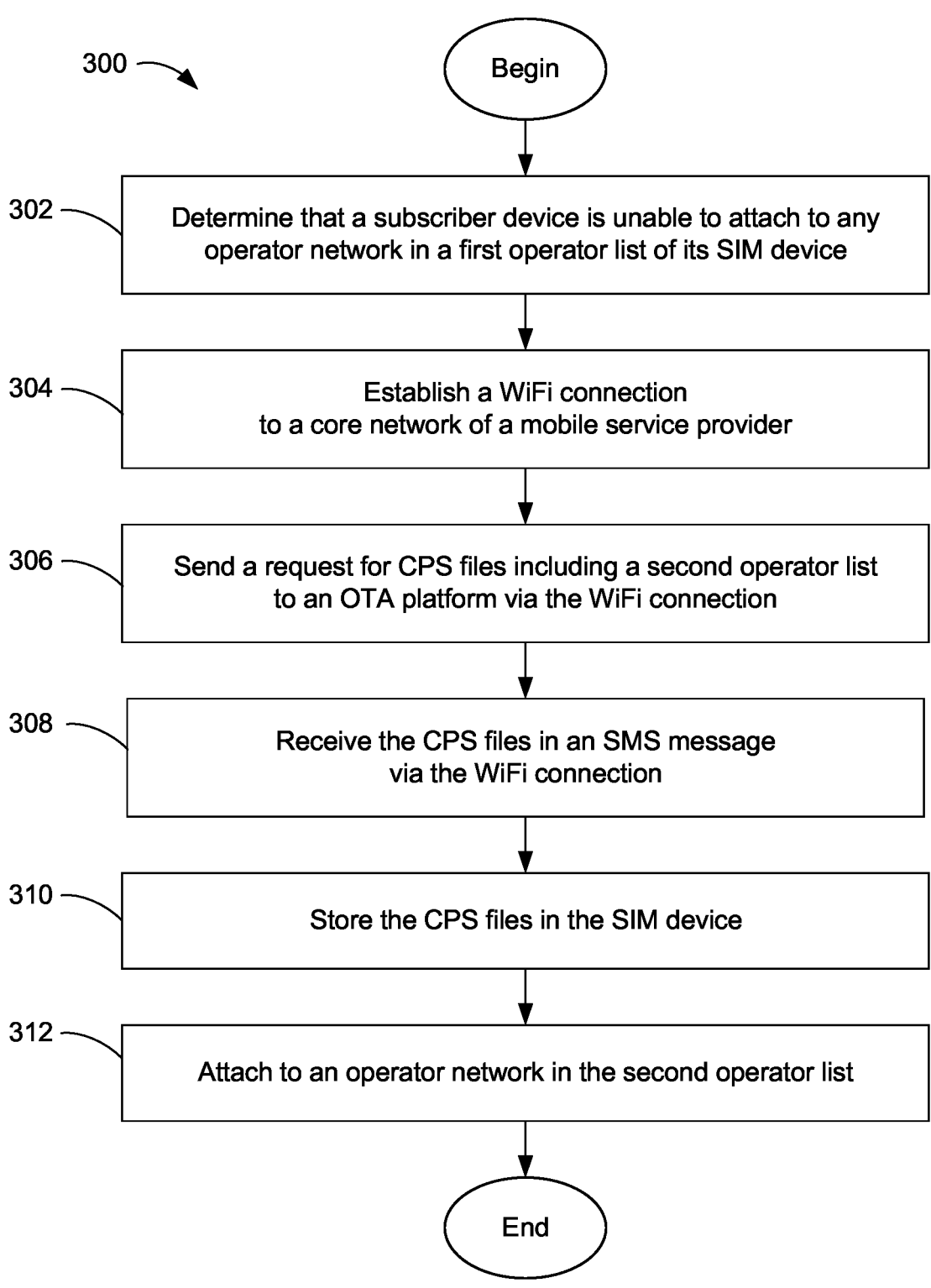

300

Begin

302 — Determine that a subscriber device is unable to attach to any operator network in a first operator list of its SIM device 304 — Establish a WiFi connection to a core network of a mobile service provider 306 — Send a request for CPS files including a second operator list to an OTA platform via the WiFi connection 308 — Receive the CPS files in an SMS message via the WiFi connection 310 — Store the CPS files in the SIM device 312 — Attach to an operator network in the second operator list End

502 — CPU

504 — Secondary Storage

508 — RAM

506 — ROM

512 — Network

600

706 — Antenna & Front End

708 — RF Transceiver

712 — Microphone
714 — Earpiece
716 — Headset

Baseband
Processing — 710

GPS — 738

704 — Memory
720 — Card
722 — USB
724 — Infrared
726 — Vibrator
728 — Switches

I/O
IFC — 718

DSP — 702

732 — Touch Screen
Controller

730 — Touch Screen Display

736 — Camera
Controller

734 — Camera

802
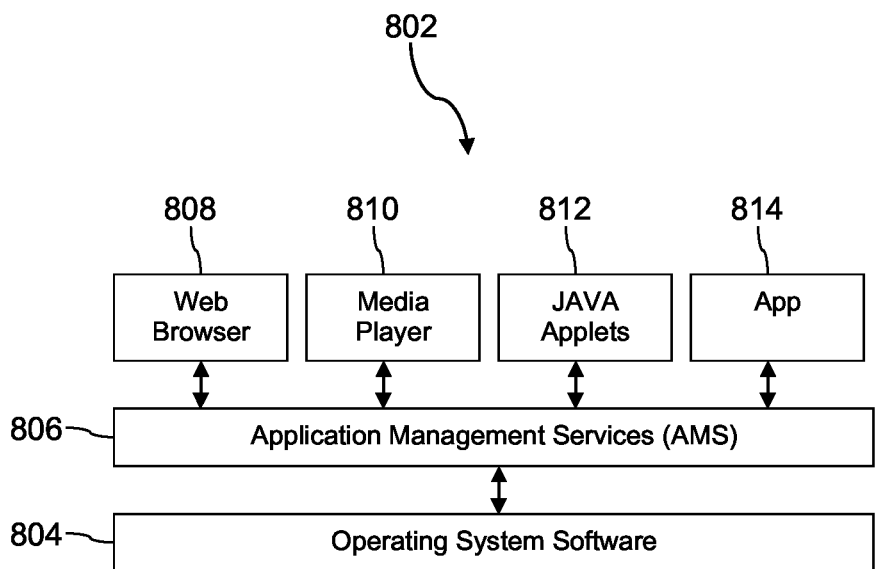
808          810          812          814
| Web Browser | Media Player | JAVA Applets | App |
806 — Application Management Services (AMS)
804 — Operating System Software
FIG. 8A
820
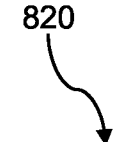
822 — Applications
824 — Application Framework
826 — Libraries          Runtime — 830
828 — OS Kernel
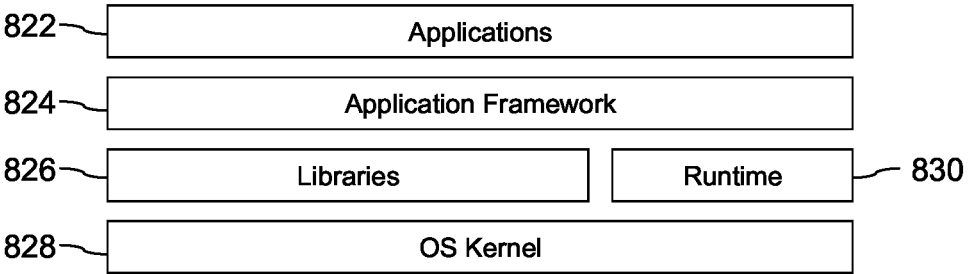
FIG. 8B

SIM PROVISIONING VIA WiFi

CROSS-REFERENCE TO RELATED APPLICATIONS

This application claims priority to U.S. Provisional Application No. 63/434,847 filed Dec. 22, 2022 and entitled, "SIM Provisioning Via WiFi," by Paul Avetoom, which is incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are used for communication, connection, organization, information, and entertainment. A Subscriber Identity Module (SIM) card is an integrated circuit that is intended to securely store the International Mobile Subscriber Identity (IMSI) number and its related key, which are used to identify and authenticate a subscriber device for attachment to a radio access network (RAN) of a mobile service provider, for example to receive a wireless link from a cell site. Typically, a SIM card is an embedded semiconductor molded into a plastic card made of PVC. The embedded semiconductor circuit is part of a universal integrated circuit card (UICC) physical smart card that contains a unique serial number, Integrated Circuit Card Identifier (ICCID), IMSI, and other security information associated with the mobile service provider. In some embodiments, the SIM card is removable from the subscriber device. In other embodiments, the SIM is an embedded-SIM (eSIM) or embedded universal integrated circuit card (eUICC) that is embedded directly into a subscriber device. SIM cards and eSIMs may also be referred to as SIM devices.

When a subscriber device is used for the first time after installation of (or fabrication with) a new SIM device, the SIM device contacts an OTA (Over-The-Air) platform via the RAN to receive Card Personalization System (CPS) files that include a card profile defining a file system and other properties of the SIM card as well as other card specific data. Once the SIM card has received and installed the CPS files, the subscriber device is fully provisioned to operate in the mobile service provider network.

SUMMARY

In an embodiment, a method for obtaining, at first activation of a SIM device, CPS files from a mobile service provider is disclosed. The method comprises establishing by an application stored on the SIM device before activation a WiFi connection to a core network of the mobile service provider, sending by the application via the WiFi connection a message to an OTA platform of the mobile service provider, the message comprising an identifier of the SIM device and a request for CPS files associated with the SIM device, receiving by the application a Short Message Service (SMS) message via the WiFi connection, the SMS message comprising the CPS files, and storing by the application the CPS files in the SIM device.

In another embodiment, a subscriber device configured to obtain, at first activation of a SIM device, CPS files from a mobile service provider is disclosed. The subscriber device comprises a WiFi antenna, a WiFi transceiver coupled to the WiFi antenna, a non-transitory memory, a device processor coupled to the non-transitory memory and to the WiFi transceiver, and a SIM provisioning application stored in the SIM device prior to activation that, when executed by the processor establishes a WiFi connection to a core network of the mobile service provider sends via the WiFi connection a message to an OTA platform of the mobile service provider, the message comprising an identifier of the SIM device and a request for CPS files associated with the SIM device, receives a Short Message Service (SMS) message via the WiFi connection, the SMS message comprising the CPS files, and stores in the SIM device the CPS files.

In yet another embodiment, a method for obtaining CPS files from a mobile service provider when a subscriber device is unable at power up to attach to any operator network in an operator list of a SIM device is disclosed. The method comprises determining by an application stored on the SIM device that the application is unable to attach to any operator network in a first operator list of the SIM device, establishing by the application a WiFi connection to a core network of the mobile service provider, sending by the application via the WiFi connection a message to an OTA platform of the mobile service provider, the message comprising an identifier of the SIM device and a request for CPS files associated with the SIM device, receiving by the application a Short Message Service (SMS) message via the WiFi connection, the SMS message comprising the CPS files, the CPS files comprising a second operator list based on a geographical location of the SIM device, storing by the application the CPS files in the SIM device, and attaching to an operator network in the second operator list.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 is a flow chart of a method according to an embodiment of the disclosure.

FIG. 8A is a block diagram of a software architecture of a wireless communication device according to an embodiment of the disclosure.

FIG. 8B is a block diagram of another software architecture of a wireless communication device according to an embodiment of the disclosure.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

SIMs are currently configured to be provisioned over a RAN of a mobile service provider, however there are circumstances where a subscriber device may not be able to access a RAN when it is first activated in a first example, the subscriber device is out of range of the RAN. In a second example, the subscriber device is in a region for which it does not have a Preferred Roaming List (PRL). In a third example, the SIM has not been pre-programmed with an IP Multimedia Subsystem Public User Identity (IMPU).

A system according to the disclosure provides the capability of delivering SIM credentials over WiFi in any of these three examples (and in other circumstances) where the subscriber device is not able to access a RAN when it is first activated. More particularly, during activation a subscriber device connects to a WiFi network (or other non-OTA access network) to establish a data bearer path. An application in the SIM connects over this data bearer path to a SIM OTA platform. The SIM OTA platform sends a Short Message Service (SMS) message containing an OTA CPS file to an SMS platform. The SMS platform delivers the SMS message to the subscriber device via either a Non-3GPP Interworking Function (N3IWF) in a 5G network or an enhanced Packet Data Gateway (ePDG) in a 3GPP network. The SIM on the subscriber device installs the contents of the CPS file and is thus provisioned for communication over the RAN.

In this way the SMS is delivered over a non-access stratum (NAS) to the SIM card in a circumstance where the subscriber device is not able to access a RAN when it is first activated. This provides the benefit that the SIM card is provided with CPS files it would normally only receive via the RAN. The system according to the disclosure differs from prior provisioning systems at least in that prior systems rely on automated provisioning of a SIM over a telephony RAN, while in the system according to the disclosure the automated provisioning of the SIM is over a non-telephony network—for example, WiFi.

Figure 1:
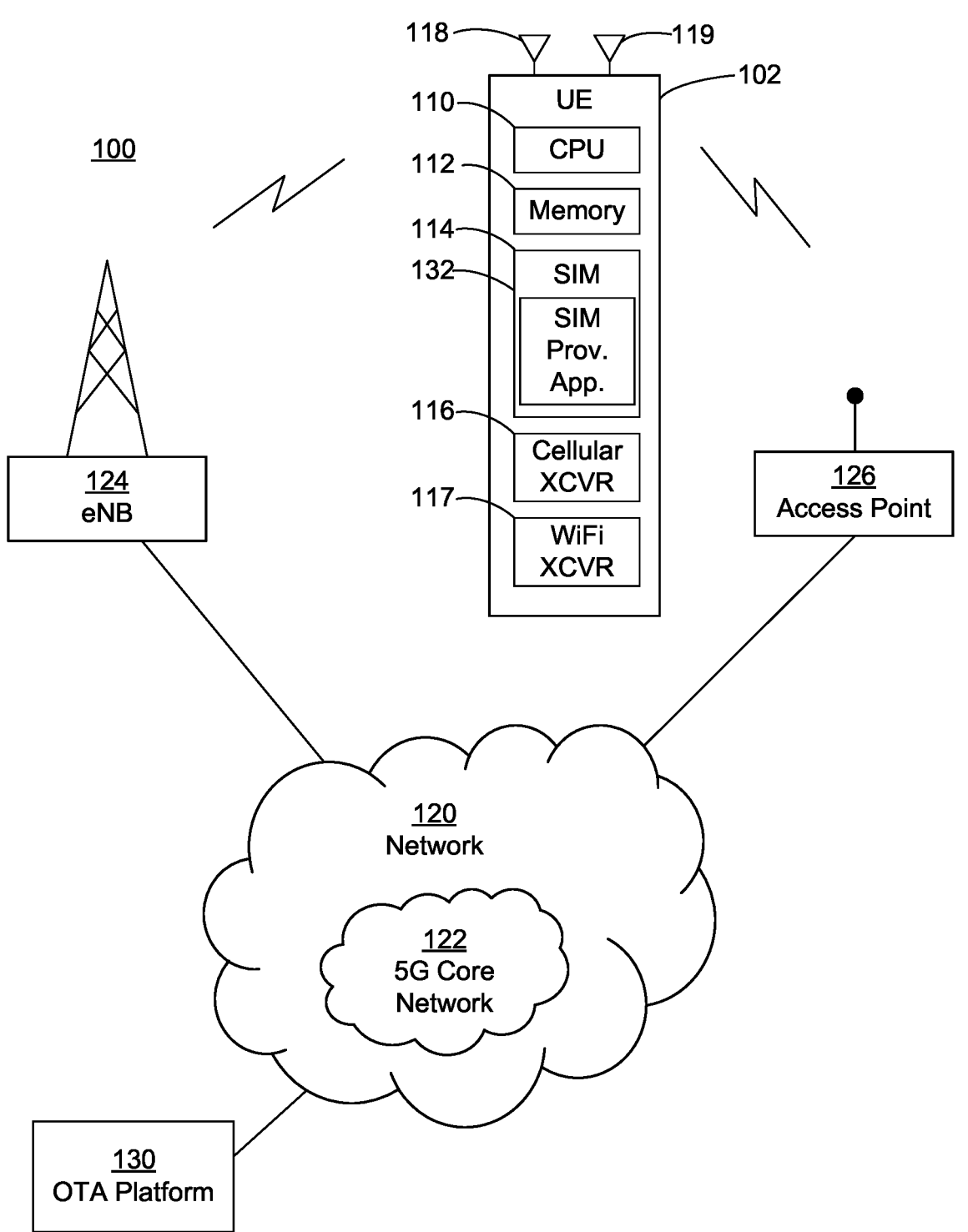
FIG. 1 is a block diagram of a communication system according to an embodiment of the disclosure.

Turning now to FIG. 1, a communication system 100 according to the disclosure is described. In an embodiment, the system 100 comprises User Equipment (UE) 102 and OTA platform 130, communicating wired or wirelessly via a network 120. The UE 102 may be a handheld device, such as a smart phone or tablet, or a laptop computer, communicating wirelessly with the network 120. The network 120 may be one or more public networks, one or more private networks, or a combination thereof. The network 120 may comprise or be coupled to a 5G core network 122 or, in other embodiments, a 4G or 4G Long Term Evolution (LTE) network.

The UE 102 comprises a processor 110, a memory 112, a subscriber identification (or identity) device (SIM) 114, a cellular radio transceiver 116, a radio antenna 118, a WiFi transceiver 117, and a WiFi antenna 119. In other embodiments, the SIM 114 may be an embedded SIM (eSIM). The SIM 114 includes a SIM provisioning application 132. A portion of the memory 112 may be a non-transitory memory and a portion of the memory 112 may be a transitory memory.

When properly activated and provisioned, the UE 102 may be able to establish a wireless communication link to a radio access network (RAN), for example to an evolved Node B (eNB) 124. The eNB 124 may also be referred to as a cell site or cell tower in some contexts. The eNB 124 may provide the UE 102 a communication link to the network 120. The UE 102 may communicate via the eNB 124 and via the network 120 to the OTA platform 130.

Prior to provisioning of the SIM 114, the UE 102 may be able to establish a WiFi communication link (or WiFi connection) to the network 120, for example via a WiFi access point 126. The access point 126 may provide the UE 102 a WiFi connection to the network 120. The UE 102 may communicate via the access point 126 and via the network 120 to the OTA platform 130.

The network 120 may include elements from more than one wired or wireless service provider. For example, the UE 102 may be coupled to the network 120 via a first service provider, while the access point 126 may be coupled via a second service provider. Any of the elements of system 100 may be coupled to other elements via the 5G core network 122. Where the network 120 comprises elements from multiple service providers, the network 120 may include a plurality of 5G core networks 122, each supported by a different service provider and coupled to each other directly or via wired or wireless connections through non-5G elements of the network 120.

The SIM 114 may be provisioned over a RAN of a mobile service provider via the eNB 124 where the UE 102 is able to access the eNB 124 when the UE 102 is first activated. However, there are circumstances where the UE 102 is not able to access the eNB 124 when the UE 102 is first activated. Examples of such circumstances include: where the subscriber device is out of range of the eNB 124, where the UE 102 is in a region where its PRL does not provide information enabling the UE 102 to communicate with the eNB 124, where the SIM 114 has been pre-programmed with an IMPU, or other similar impediment to the UE 102 communicating with the eNB 124.

The communication system 100 is configured to deliver SIM credentials over WiFi, if needed. If the UE 102 is unable communicate with the eNB 124, the UE 102 is configured to connect to the access point 126 to establish a data bearer path via a non-OTA access network to the network 120. The SIM provisioning application 132 connects over this data bearer path to the OTA platform 130. The OTA platform 130 sends an SMS message containing an OTA CPS file to an SMS platform of the network 120. The SMS platform delivers the SMS message to the UE 102 via either an N3IWF in a 5G network or an EPDG in a 3GPP network. The SIM provisioning application 132 installs the contents of the CPS file in the SIM 114 and the UE 102 is thus provisioned for communication over the RAN. In this way the SMS is delivered over a non-access stratum (NAS) connection to the SIM 114, with the result that the SIM 114 has the CPS files it would normally only receive via the eNB 124.

Figure 2:
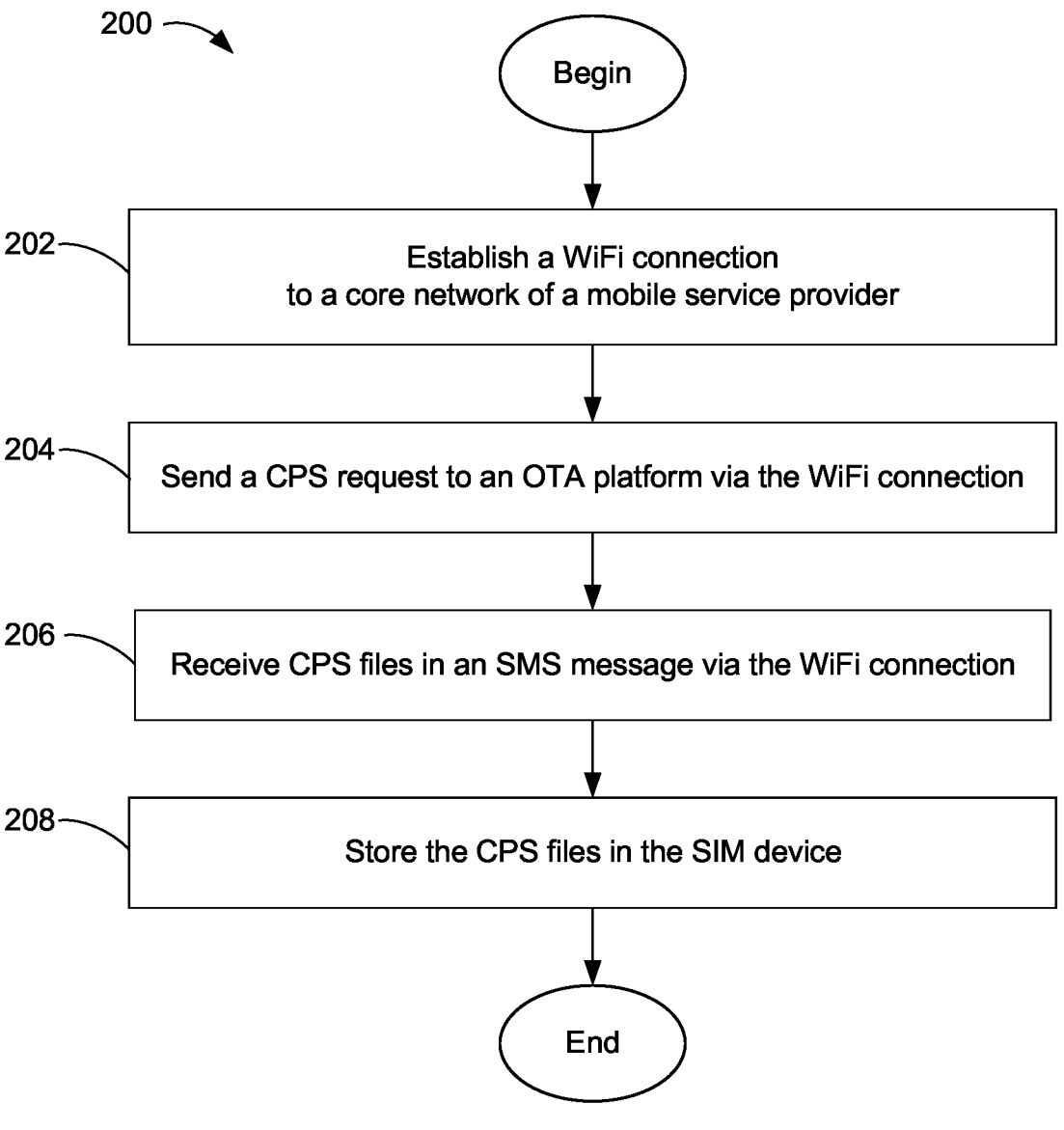
FIG. 2 is a flow chart of a method according to an embodiment of the disclosure.

FIG. 2 is a flow chart of a method 200 according to an embodiment of the disclosure. In an embodiment, the method 200 is a method for the application 132 stored on the SIM device 114 of the UE 102 to obtain CPS files over a WiFi connection or other NAS connection or data bearer.

The application 132 is stored on the SIM device 114 prior to the first activation of the SIM device 102 with a mobile service provider.

At step 202, the application 132 establishes a WiFi connection to a core network of the mobile service provider. Step 202 may be performed as part of a standard process at first startup of the UE 102 or may be performed in response to the application 132 attempting and failing to establish a connection to the core network via a RAN. In various embodiments, the WiFi connection to the core network may be established via an ePDG of an LTE core network or a N3IWF of a 5G core network.

At step 204, the application 132 sends a message to an OTA platform 130 via the WiFi connection. The message includes an identifier of the SIM device 114 and a request for CPS files associated with the SIM device 114. In various embodiments, the identifier of the SIM device 114 may include one or more of a security certificate, a unique serial number, an ICCID, and an IMSI and its related key. In some embodiments, the message is sent to the OTA platform 130 at a Fully Qualified Domain Name (FQDN) address stored in the SIM device 114.

At step 206, the application 132 receives an SMS message via the WiFi connection, the SMS message comprising the requested CPS files. In various embodiments, the CPS files may include one or both of a PRL and an IMPU. At step 208, the received CPS files are stored in the SIM device 114, thereby completing initial provisioning of the SIM device 114 over a WiFi connection or other NAS connection or data bearer.

FIG. 3 is a flow chart of a method 300 according to an embodiment of the disclosure. In an embodiment, the method 300 is a method for the application 132 stored on the SIM device 114 of the UE 102 to obtain CPS files over a WiFi connection or other NAS connection or data bearer when the application 132 is unable at power up to attach to any operator network in an operator list of the SIM device 114—for example, after an international flight, when the UE 102 is first powered in a different country than that in which it was last used. The application 132 is stored on the SIM device 114 prior to the first activation of the SIM device 102 with a mobile service provider.

At step 302, the application 132 determines that it is unable to attach to any operator network in a first operator list stored in the SIM device 114. In some embodiments, the application 132 makes the determination by attempting to establish a connection to a core network of the mobile service provider via a RAN of each operator in the first operator list.

At step 304, the application 132 establishes a WiFi connection to the core network. In various embodiments, the WiFi connection to the core network may be established via an ePDG of an LTE core network or a N3IWF of a 5G core network.

At step 306, the application 132 sends a message to an OTA platform 130 via the WiFi connection. The message includes an identifier of the SIM device 114 and a request for CPS files associated with the SIM device 114. In various embodiments, the identifier of the SIM device 114 may include one or more of a security certificate, a unique serial number, an ICCID, and an IMSI and its related key. In some embodiments, the message is sent to the OTA platform 130 at an FQDN address stored in the SIM device 114. In some embodiments, the application receives a broadcast from a nearby cell site, obtains from the broadcast a mobile country code (which indicates a geographical location of the SIM device 114), and includes the mobile country code in the message sent to the OTA platform 130. In other embodiments, the OTA platform 130 may determine the geographical location of the SIM device 114 from information relating to a geographical location of the access point 126 or a geographical location of a network node through which the message sent to the OTA platform 130 is routed on its path from the access point 126.

At step 308, the application 132 receives an SMS message via the WiFi connection, the SMS message comprising the requested CPS files, where the CPS files include a second operator list based on the geographical location of the SIM device. In various embodiments, the CPS files may include one or both of a PRL and an IMPU.

At step 310, the received CPS files are stored in the SIM device 114, thereby completing initial provisioning of the SIM device 114 over a WiFi connection or other NAS connection or data bearer. At step 312, the UE 102 attaches to a RAN of an operator network in the second operator list.

Figure 4:
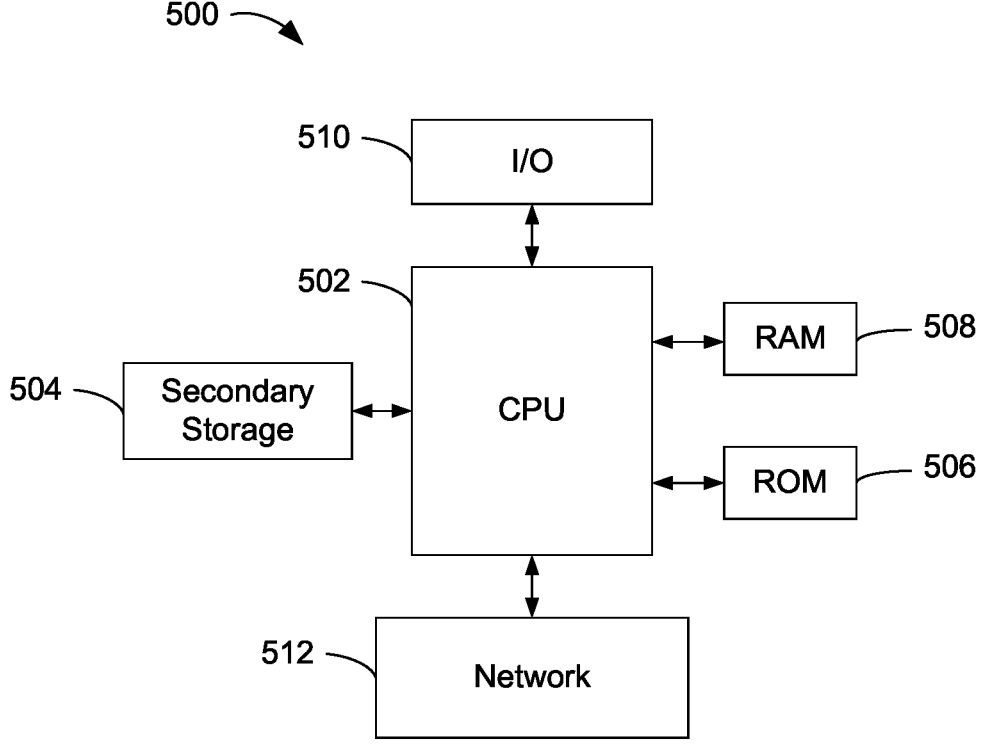
FIG. 4 illustrates a computer system suitable for implementing one or more embodiments disclosed herein.

FIG. 4 illustrates a computer system 500 suitable for implementing one or more embodiments disclosed herein. The computer system 500 includes a processor 502 (which may be referred to as a central processor unit, CPU, or device processor) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/ or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

Figure 5:
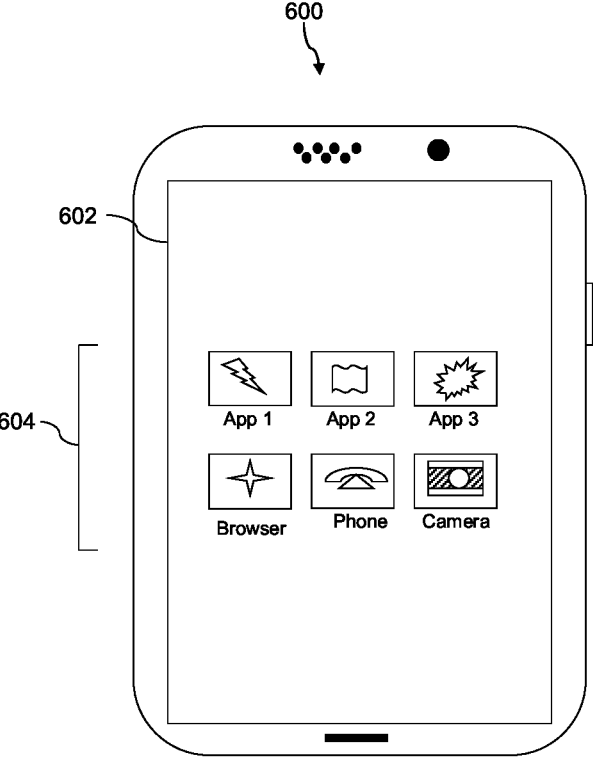
FIG. 5 is an illustration of a wireless communication device according to an embodiment of the disclosure.

FIG. 5 depicts the user equipment (UE) 600, which is operable for implementing aspects of the present disclosure, but the present disclosure should not be limited to these implementations. Though illustrated as a mobile phone, the UE 600 may take various forms including a wireless handset, a pager, a personal digital assistant (PDA), a gaming device, or a media player. The UE 600 includes a touchscreen display 602 having a touch-sensitive surface for input by a user. A small number of application icons 604 are illustrated within the touch screen display 602. It is understood that in different embodiments, any number of application icons 604 may be presented in the touch screen display 602. In some embodiments of the UE 600, a user may be able to download and install additional applications on the UE 600, and an icon associated with such downloaded and installed applications may be added to the touch screen display 602 or to an alternative screen. The UE 600 may have other components such as electro-mechanical switches, speakers, camera lenses, microphones, input and/or output connectors, and other components as are well known in the art. The UE 600 may present options for the user to select, controls for the user to actuate, and/or cursors or other indicators for the user to direct. The UE 600 may further accept data entry from the user, including numbers to dial or various parameter values for configuring the operation of the handset. The UE 600 may further execute one or more software or firmware applications in response to user commands. These applications may configure the UE 600 to perform various customized functions in response to user interaction. Additionally, the UE 600 may be programmed and/or configured over-the-air, for example from a wireless base station, a wireless access point, or a peer UE 600. The UE 600 may execute a web browser application which enables the touch screen display 602 to show a web page. The web page may be obtained via wireless communications with a base transceiver station, a wireless network access node, a peer UE 600 or any other wireless communication network or system.

Figure 6:
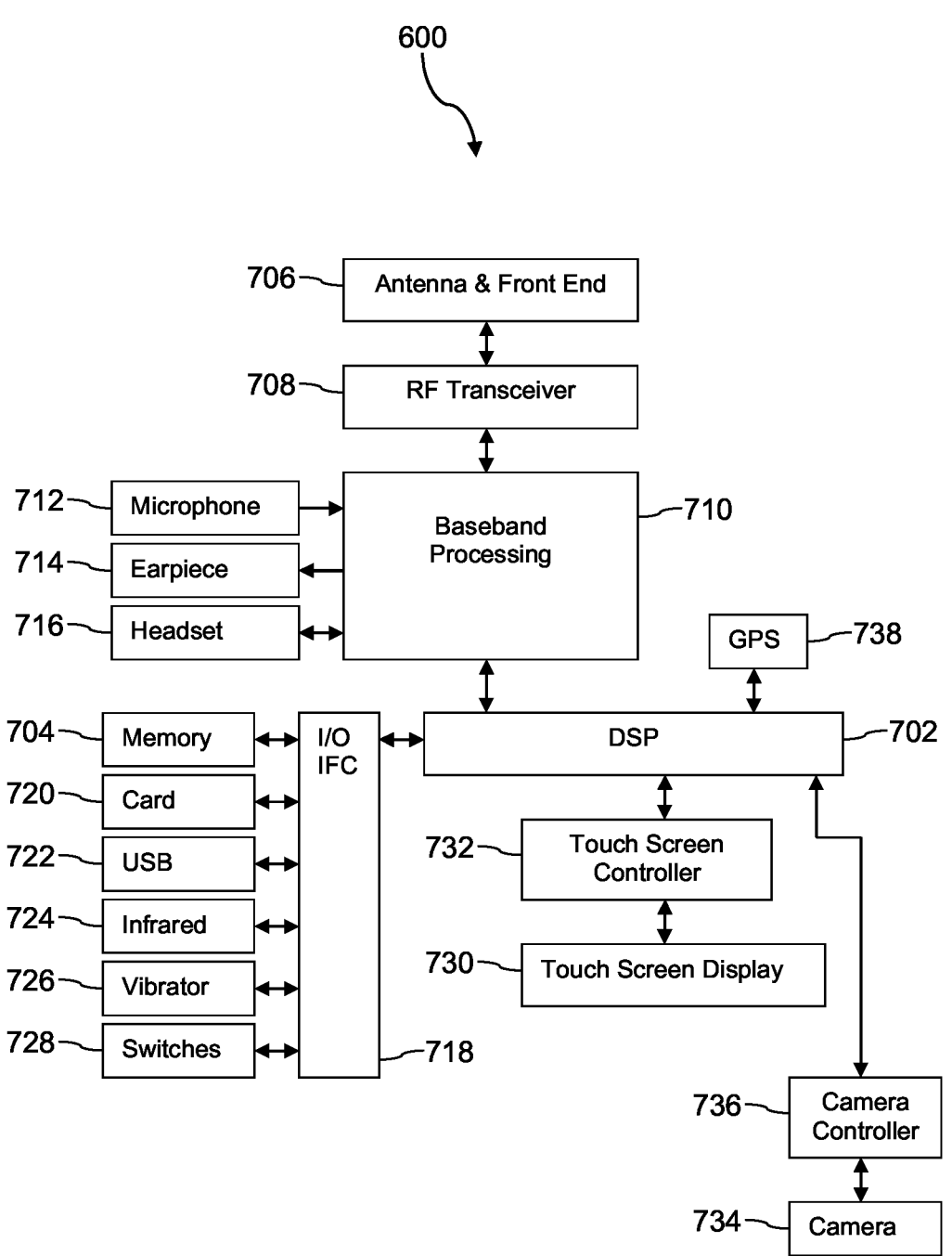
FIG. 6 is a block diagram or a hardware architecture of a wireless communication device according to an embodiment of the disclosure.

FIG. 6 shows a block diagram of the UE 600. While a variety of known components of handsets are depicted, in an embodiment a subset of the listed components and/or additional components not listed may be included in the UE 600. The UE 600 includes a digital signal processor (DSP) 702 and a memory 704. As shown, the UE 600 may further include one or more antenna and front end unit 706, a one or more radio frequency (RF) transceiver 708, a baseband processing unit 710, a microphone 712, an earpiece speaker 714, a headset port 716, an input/output interface 718, a removable memory card 720, a universal serial bus (USB) port 722, an infrared port 724, a vibrator 726, one or more electro-mechanical switches 728, a touch screen display 730, a touch screen controller 732, a camera 734, a camera controller 736, and a global positioning system (GPS) receiver 738. In an embodiment, the UE 600 may include another kind of display that does not provide a touch sensitive screen. In an embodiment, the UE 600 may include both the touch screen display 730 and additional display component that does not provide a touch sensitive screen. In an embodiment, the DSP 702 may communicate directly with the memory 704 without passing through the input/output interface 718. Additionally, in an embodiment, the UE 600 may comprise other peripheral devices that provide other functionality.

The DSP 702 or some other form of controller or central processing unit operates to control the various components of the UE 600 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the UE 600 to function as a peripheral device to exchange information with a personal computer or other computer system. The infrared port 724 and other optional ports such as a Bluetooth® interface or an IEEE 802.11 compliant wireless interface may enable the UE 600 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 708 may comprise a near field communication (NFC) transceiver. The NFC transceiver may be used to complete payment transactions with point-of-sale terminals or other communications exchanges. In an embodiment, each of the different radio transceivers 708 may be coupled to its own separate antenna. In an embodiment, the UE 600 may comprise a radio frequency identify (RFID) reader and/or writer device.

The switches 728 may couple to the DSP 702 via the input/output interface 718 to provide one mechanism for the user to provide input to the UE 600. Alternatively, one or more of the switches 728 may be coupled to a motherboard of the UE 600 and/or to components of the UE 600 via a different path (e.g., not via the input/output interface 718), for example coupled to a power control circuit (power button) of the UE 600. The touch screen display 730 is another input mechanism, which further displays text and/or graphics to the user. The touch screen LCD controller 732 couples the DSP 702 to the touch screen display 730. The GPS receiver 738 is coupled to the DSP 702 to decode global positioning system signals, thereby enabling the UE 600 to determine its position.

Figure 7A:
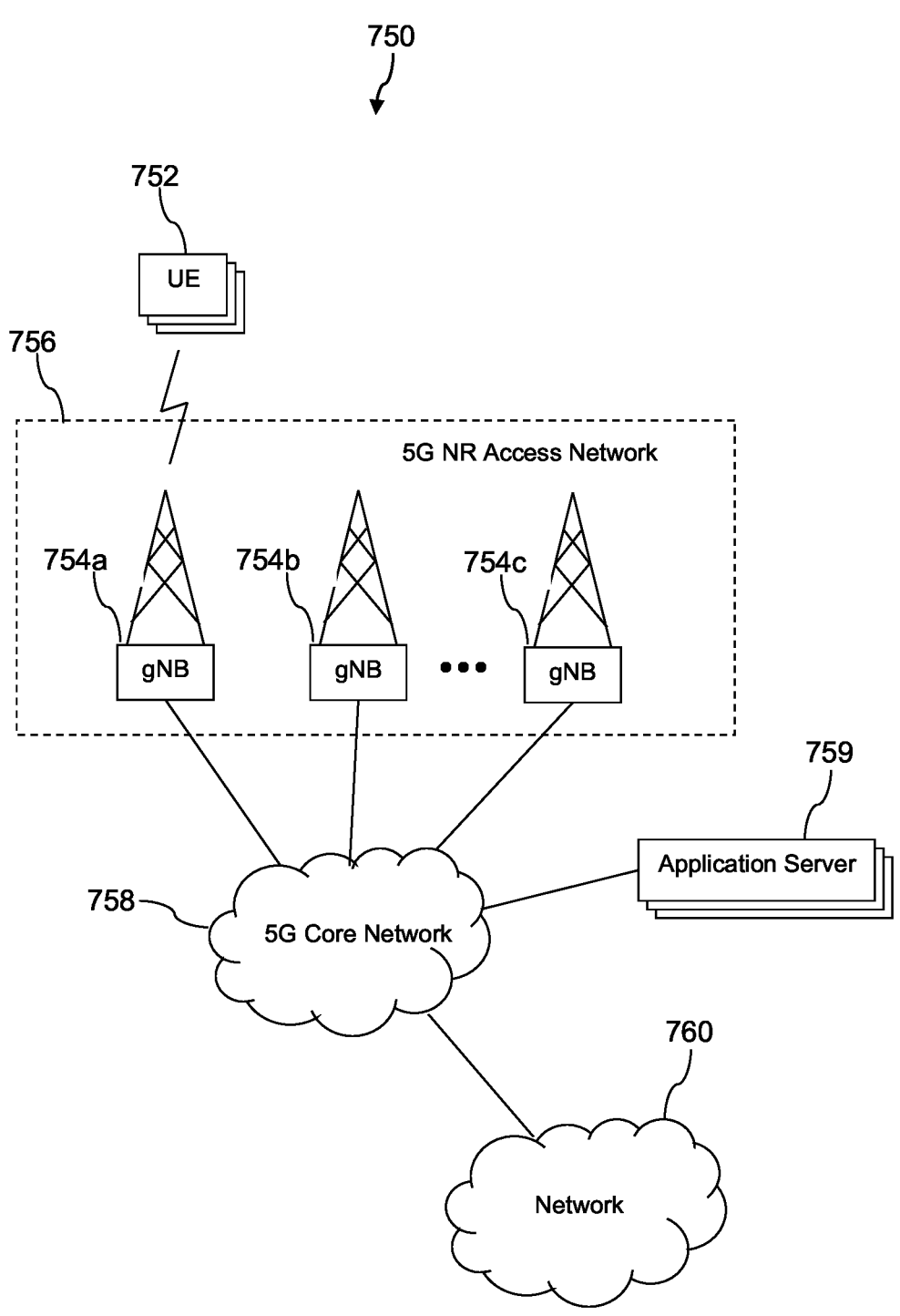
FIG. 7A is a block diagram of another communication system according to an embodiment of the disclosure.

Turning now to FIG. 7A, an exemplary communication system 750 is described. Typically, the communication system 750 includes a number of access nodes 754 that are configured to provide coverage in which UEs 752 such as cell phones, tablet computers, machine-type-communication devices, tracking devices, embedded wireless modules, and/ or other wirelessly equipped communication devices (whether or not user operated), can operate. The access nodes 754 may be said to establish an access network 756. The access network 756 may be referred to as a radio access network (RAN) in some contexts. In a 5G technology generation an access node 754 may be referred to as a next Generation Node B (gNB). In 4G technology (e.g., long term evolution (LTE) technology) an access node 754 may be referred to as an evolved Node B (eNB). In 3G technology (e.g., code division multiple access (CDMA) and global system for mobile communication (GSM)) an access node 754 may be referred to as a base transceiver station (BTS) combined with a base station controller (BSC). In some contexts, the access node 754 may be referred to as a cell site or a cell tower. In some implementations, a picocell may provide some of the functionality of an access node 754, albeit with a constrained coverage area. Each of these different embodiments of an access node 754 may be considered to provide roughly similar functions in the different technology generations.

In an embodiment, the access network 756 comprises a first access node 754a, a second access node 754b, and a third access node 754c. It is understood that the access network 756 may include any number of access nodes 754.

Further, each access node 754 could be coupled with a core network 758 that provides connectivity with various application servers 759 and/or a network 760. In an embodiment, at least some of the application servers 759 may be located close to the network edge (e.g., geographically close to the UE 752 and the end user) to deliver so-called "edge computing." The network 760 may be one or more private networks, one or more public networks, or a combination thereof. The network 760 may comprise the public switched telephone network (PSTN). The network 760 may comprise the Internet. With this arrangement, a UE 752 within coverage of the access network 756 could engage in air-interface communication with an access node 754 and could thereby communicate via the access node 754 with various application servers and other entities.

The communication system 750 could operate in accordance with a particular radio access technology (RAT), with communications from an access node 754 to UEs 752 defining a downlink or forward link and communications from the UEs 752 to the access node 754 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 754 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 754 could define an air interface configured in a specific manner to define physical resources for carrying information wirelessly between the access node 754 and UEs 752.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and sub-carrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 752.

In addition, certain resource elements on the example air interface could be reserved for special purposes. For instance, on the downlink, certain resource elements could be reserved to carry synchronization signals that UEs 752 could detect as an indication of the presence of coverage and to establish frame timing, other resource elements could be reserved to carry a reference signal that UEs 752 could measure in order to determine coverage strength, and still other resource elements could be reserved to carry other control signaling such as PRB-scheduling directives and acknowledgement messaging from the access node 754 to served UEs 752. And on the uplink, certain resource elements could be reserved to carry random access signaling from UEs 752 to the access node 754, and other resource elements could be reserved to carry other control signaling such as PRB-scheduling requests and acknowledgement signaling from UEs 752 to the access node 754.

The access node 754, in some instances, may be split functionally into a radio unit (RU), a distributed unit (DU), and a central unit (CU) where each of the RU, DU, and CU have distinctive roles to play in the access network 756. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 7B:
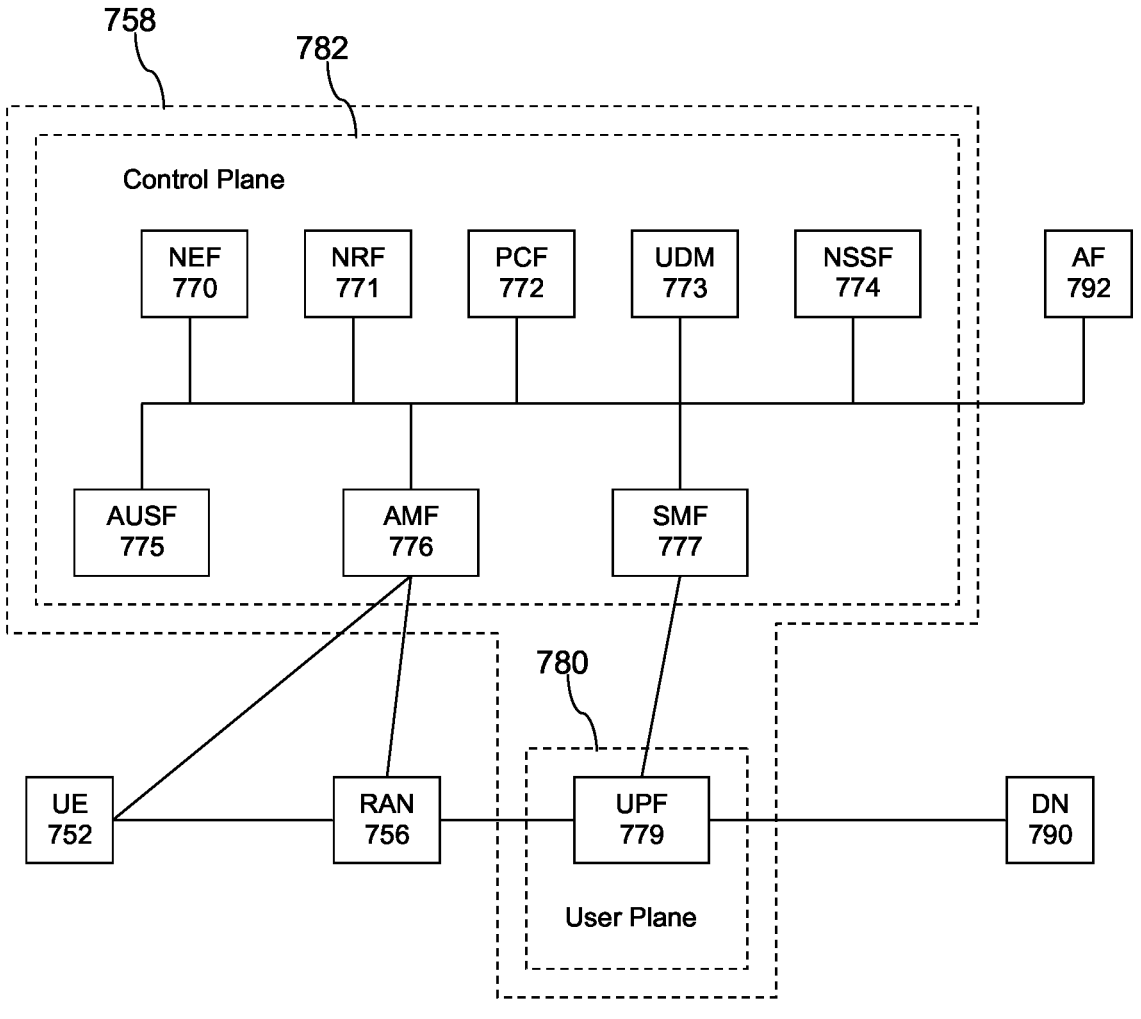
FIG. 7B is a block diagram of a core network of the communication system of FIG. 8A according to an embodiment of the disclosure.

Turning now to FIG. 7B, further details of the core network 758 are described. In an embodiment, the core network 758 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 779, an authentication server function (AUSF) 775, an access and mobility management function (AMF) 776, a session management function (SMF) 777, a network exposure function (NEF) 770, a network repository function (NRF) 771, a policy control function (PCF) 772, a unified data management (UDM) 773, a network slice selection function (NSSF) 774, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 758 may be segregated into a user plane 780 and a control plane 782, thereby promoting independent scalability, evolution, and flexible deployment.

The UPF 779 delivers packet processing and links the UE 752, via the access network 756, to a data network 790 (e.g., the network 560 illustrated in FIG. 8A). The AMF 776 handles registration and connection management of non-access stratum (NAS) signaling with the UE 752. Said in other words, the AMF 776 manages UE registration and mobility issues. The AMF 776 manages reachability of the UEs 752 as well as various security issues. The SMF 777 handles session management issues. Specifically, the SMF 777 creates, updates, and removes (destroys) protocol data unit (PDU) sessions and manages the session context within the UPF 779. The SMF 777 decouples other control plane functions from user plane functions by performing dynamic host configuration protocol (DHCP) functions and IP address management functions. The AUSF 775 facilitates security processes.

The NEF 770 securely exposes the services and capabilities provided by network functions. The NRF 771 supports service registration by network functions and discovery of network functions by other network functions. The PCF 772 supports policy control decisions and flow based charging control. The UDM 773 manages network user data and can be paired with a user data repository (UDR) that stores user data such as customer profile information, customer authentication number, and encryption keys for the information. An application function 792, which may be located outside of the core network 758, exposes the application layer for interacting with the core network 758. In an embodiment, the application function 792 may be execute on an application server 779 located geographically proximate to the UE 752 in an "edge computing" deployment mode. The core network 758 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 774 can help the AMF 776 to select the network slice instance (NSI) for use with the UE 752.

FIG. 8A illustrates a software environment 802 that may be implemented by the DSP 702. The DSP 702 executes operating system software 804 that provides a platform from which the rest of the software operates. The operating system software 804 may provide a variety of drivers for the handset hardware with standardized interfaces that are accessible to application software. The operating system software 804 may be coupled to and interact with application management services (AMS) 806 that transfer control between applications running on the UE 400. Also shown in FIG. 8A are a web browser application 808, a media player application 810, and JAVA applets 812. The web browser application 808 may be executed by the UE 400 to browse content and/or the Internet, for example when the UE 400 is coupled to a network via a wireless link. The web browser application 808 may permit a user to enter information into forms and select links to retrieve and view web pages. The media player application 810 may be executed by the UE 400 to play audio or audiovisual media. The JAVA applets 812 may be executed by the UE 400 to provide a variety of functionality including games, utilities, and other functionality.

FIG. 8B illustrates an alternative software environment 820 that may be implemented by the DSP 702. The DSP 702 executes operating system kernel (OS kernel) 828 and an execution runtime 830. The DSP 702 executes applications 822 that may execute in the execution runtime 830 and may rely upon services provided by the application framework 824. Applications 822 and the application framework 824 may rely upon functionality provided via the libraries 826.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for obtaining, at first activation of a Subscriber Identity Module (SIM) device, card personalization (CPS) files from a mobile service provider, the method comprising:

initiating an activation attempt for the SIM device by attempting to establish a connection over a radio access network (RAN) with the mobile service provider;

establishing by an application stored on the SIM device a WiFi connection via a detected wireless local access network (WLAN) to an Over-The-Air (OTA) platform of the mobile service provider in a core network of the mobile service provider in response to determining that the application is unable to attach to the RAN;

sending by the application via the WiFi connection a message to the OTA platform of the mobile service provider, the message comprising an identifier of the SIM device and a request for CPS files associated with the SIM device;

receiving by the application a Short Message Service (SMS) message via the WiFi connection, the SMS message comprising the CPS files; and storing by the application the CPS files in the SIM device.

2. The method of claim 1, wherein the WiFi connection to the core network is established via one of an enhanced Packet Data Gateway (ePDG) of a Long Term Evolution (LTE) core network and a Non-3GPP Interworking Function (N3IWF) of a 5G core network.

3. The method of claim 1, wherein the identifier of the SIM device comprises one or more of a security certificate, a unique serial number, an Integrated Circuit Card Identifier (ICCID), and an International Mobile Subscriber Identity (IMSI) number and its related key.

4. The method of claim 1, wherein the CPS files include one or both of a Preferred Roaming List (PRL) and an IP Multimedia Subsystem Public User Identity (IMPU).

5. The method of claim 1, wherein the message to the OTA platform is sent to a Fully Qualified Domain Name (FQDN) address stored in the SIM device.

6. The method of claim 1, wherein the SIM device is a removable SIM card.

7. A subscriber device configured to obtain, at first activation of a Subscriber Identity Module (SIM) device, card personalization (CPS) files from a mobile service provider, the subscriber device comprising:

a WiFi antenna;

a WiFi transceiver coupled to the WiFi antenna;

a non-transitory memory;

a device processor coupled to the non-transitory memory and to the WiFi transceiver; and a SIM provisioning application stored in the SIM device prior to activation that, when executed by the device processor:

initiate an activation attempt for the SIM device by attempting to establish a connection over a radio access network (RAN) with the mobile service provider;

establishes a WiFi connection via a detected wireless local access network (WLAN) to an Over-The-Air (OTA) platform of the mobile service provider in a core network of the mobile service provider in response to determining that the SIM provisioning application is unable to attach to the RAN;

sends via the WiFi connection a message to the OTA platform of the mobile service provider, the message comprising an identifier of the SIM device and a request for CPS files associated with the SIM device;

receives a Short Message Service (SMS) message via the WiFi connection, the SMS message comprising the CPS files; and stores in the SIM device the CPS files.

8. The subscriber device of claim 7, wherein:

the subscriber device further comprises:

a radio antenna; and a radio transceiver coupled to the radio antenna.

9. The subscriber device of claim 7, wherein the WiFi connection to the core network is established via one of an enhanced Packet Data Gateway (ePDG) of a Long Term Evolution (LTE) core network and a Non-3GPP Interworking Function (N3IWF) of a 5G core network.

10. The subscriber device of claim 7, wherein the identifier of the SIM device comprises one or more of a security certificate, an Integrated Circuit Card Identifier (ICCID), and an International Mobile Subscriber Identity (IMSI) number and its related key.

11. The subscriber device of claim 7, wherein the CPS files include one or both of a Preferred Roaming List (PRL) and an IP Multimedia Subsystem Public User Identity (IMPU).

12. The subscriber device of claim 7, wherein the SIM provisioning application sends the message to the OTA platform to a Fully Qualified Domain Name (FQDN) address stored in the SIM device.

13. A method for obtaining card personalization (CPS) files from a mobile service provider when a subscriber device is unable to attach to any operator network in an operator list of a Subscriber Identity Module (SIM) device, the method comprising:

for each operator network in a first operator list on the SIM device, initiating an activation attempt for the SIM device by attempting to establish a connection over a radio access network (RAN) of the operator network;

determining by an application stored on the SIM device that the application is unable to attach to the RAN network of any operator network in the first operator list;

establishing by the application a WiFi connection via a detected wireless local access network (WLAN) to an Over-The-Air (OTA) platform of the mobile service provider in a core network of the mobile service provider in response to determining that the application is unable to attach to the RAN of any operator network in the first operator list;

sending by the application via the WiFi connection a message to the OTA platform of the mobile service provider, the message comprising an identifier of the SIM device and a request for CPS files associated with the SIM device;

receiving by the application a Short Message Service (SMS) message via the WiFi connection, the SMS message comprising the CPS files, the CPS files comprising a second operator list based on a geographical location of the SIM device;

storing by the application the CPS files in the SIM device; and attaching to an operator network in the second operator list.

14. The method of claim 13, wherein the WiFi connection to the core network is established via one of an enhanced Packet Data Gateway (ePDG) of a Long Term Evolution (LTE) core network and a Non-3GPP Interworking Function (N3IWF) of a 5G core network.

15. The method of claim 13, wherein the identifier of the SIM device comprises one or more of a security certificate, an Integrated Circuit Card Identifier (ICCID), and an International Mobile Subscriber Identity (IMSI) number and its related key.

16. The method of claim 13, wherein the CPS files include one or both of a Preferred Roaming List (PRL) and an IP Multimedia Subsystem Public User Identity (IMPU).

17. The method of claim 13, further comprising:

receiving a broadcast from a cell site; and obtaining from the broadcast a mobile country code, wherein the message sent to the OTA platform further comprises the mobile country code.

18. The method of claim 13, wherein the message to the OTA platform is sent to a Fully Qualified Domain Name (FQDN) address stored in the SIM device.

\*    \*    \*    \*    \*